United States Patent
Anumalasetty et al.

(10) Patent No.: US 8,639,856 B2
(45) Date of Patent: *Jan. 28, 2014

(54) SCSI RESERVATION STATUS INFORMATION ON A SAN DISK

(75) Inventors: Kiran K Anumalasetty, Bangalore (IN); Nicholas S Ham, Austin, TX (US); Purna Chandra Jasti, Madhapur (IN); Sudhir Maddali, Hyderabad (IN); Yadagiri Rajaboina, Madhapur (IN); Sanket Rathi, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 63 days.

This patent is subject to a terminal disclaimer.

(21) Appl. No.: 13/198,195

(22) Filed: Aug. 4, 2011

(65) Prior Publication Data
US 2013/0036240 A1  Feb. 7, 2013

(51) Int. Cl.
*G06F 12/00* (2006.01)
*G06F 13/00* (2006.01)

(52) U.S. Cl.
USPC ............. 710/15; 710/200; 710/108; 455/26.1

(58) Field of Classification Search
USPC ............................ 710/38, 108, 200; 455/26.1
See application file for complete search history.

(56) References Cited

U.S. PATENT DOCUMENTS

| | | | |
|---|---|---|---|
| 6,016,506 A | 1/2000 | Amuro et al. | |
| 6,954,881 B1 * | 10/2005 | Flynn, Jr. et al. | 714/43 |
| 7,272,674 B1 * | 9/2007 | Nandi et al. | 710/38 |
| 7,313,636 B2 * | 12/2007 | Qi | 710/5 |
| 7,315,914 B1 * | 1/2008 | Venkatanarayanan et al. | 710/316 |
| 7,529,816 B2 | 5/2009 | Hayden et al. | |
| 7,577,802 B1 | 8/2009 | Parsons | |
| 7,587,530 B2 | 9/2009 | McCarthy | |
| 7,716,406 B1 * | 5/2010 | Tyndall | 710/200 |
| 2005/0033888 A1 * | 2/2005 | Qi | 710/200 |
| 2005/0278465 A1 * | 12/2005 | Qi | 710/36 |
| 2008/0162839 A1 | 7/2008 | Nakamichi et al. | |

OTHER PUBLICATIONS

Hewlett-Packard; HP MSA2000 Family MPIO DSM installation guide; part No. 485499.001; First edition; Mar. 2008.
Symantec; How to use the SCSIcmd utility to perform various SCSI-2 and SCSI-3 reservation related actions; Article ID: TECH72086; Jan. 2, 2009; www.symantec.com/docs/TECH72086.
Garraway, et al; VMware Multipathing with the SAN Volume Controller and the Causes of SCSI-2 Reservation Conflicts; IBM Redpaper 4627-00; Dec. 18, 2009.

* cited by examiner

*Primary Examiner* — Ernest Unelus
(74) *Attorney, Agent, or Firm* — David Mims; Robert C. Rolnik

(57) ABSTRACT

A system and computer program product are disclosed for retrieving the reservation status information of a storage area network (SAN) device, a host transmits a persistent reservation in command with service action setting of 'read reservation' to a first LUN, wherein the host is connected to a port of the data storage server to which the LUN belongs. The host receives a message from the LUN. The host determines that the message is a success. The host sends to the LUN a persistent reservation in command with service action setting of 'read keys', responsive to a success message. The host determines that the LUN responds with a zero data length. The host determines the LUN is reserved with type 2 reservation, responsive to a determination that the LUN responds with a non-zero data length.

10 Claims, 5 Drawing Sheets

*Figure 3*

| LUN NAME | I/O PATH IDENTIFIER —350 | RESERVATION POLICY TYPES SUPPORTED BY LUN | CURRENT RESERVATION POLICY SET BY THE HOST ON THE LUN | PER PATH PR KEY |
|---|---|---|---|---|
| DISK0 301 | 0 | TYPE 1, | TYPE 2 304 | A |
|  | 1 | TYPE 2, |  | B |
|  | 2 | NO RESERVATION |  | C |
|  | 3 |  |  | D |
| DISK1 | 0 | TYPE 1, | TYPE 1 | NA |
|  | 1 | TYPE 2, |  | NA |
|  |  | NO RESERVATION |  |  |
| DISK2 | 0 | TYPE 1, | NO RESERVATION | NA |
|  | 1 | TYPE 2, |  | NA |
|  | 2 | NO RESERVATION |  | NA |

SCSI RESERVATION STATUS INFORMATION ON A SAN DISK

BACKGROUND

1. Field of the Invention

The present invention relates generally to a data processing system and computer program product for obtaining Small Computer System Interface (SCSI) reservation status information on a storage area network (SAN) device. More specifically, the present invention relates to determining if a SAN device is reserved, under which standard or protocol it is reserved under, as well as other details concerning reservations.

2. Description of the Related Art

Data centers are routinely being expanded and/or maintained to add or replace processors, each of which may be a part of a host. In order to enhance utilization, each host may be assigned or otherwise reserve use of storage. Hosts may use one of the SCSI protocols to reserve a disk, using a standard in accordance with SCSI primary commands (SPC), as promulgated by T10 technical committee of the International Committee for Information Technology Standards (INCITS).

Currently, there are two standards in use to reserve storage in the form of logical units. A logical unit or logical unit number (LUN) is one or more disk drives or other SCSI capable devices that are addressable as a unit and is presented to a host via one or more storage controllers. The protocols for communicating from a host, also known as a SCSI Initiator, to a LUN, also known as a SCSI target, can be, for example SPC-2 or SPC-3. The SPC specifies various SCSI commands according to various versions of protocols. SPC-Version 2, equivalently referred to as SPC-2, is a version of commands published in 2001. SPC-Version 3, equivalently referred to as SPC-3, is a version of commands published in 2005. In the case of SPC-2, the reservation mechanism uses RESERVE and RELEASE SCSI commands. In the case of SPC-3, the reservation mechanism uses persistent reservation (PR) SCSI Commands.

LUNs, as shipped, may have the SCSI protocol state machine installed in the form of firmware. Hosts communicating with the LUN have the flexibility to use either of the SCSI Reservation mechanisms (SPC-2 Reserve/Release or SPC-3 Persistent Reservation commands). However, hosts cannot use both the Reservation mechanisms at the same time even though the LUN supports both the Reservation mechanisms. This situation poses a challenge for the host in terms of communicating with the LUN to obtain its current reservation status.

Accordingly, a remedy is sought.

SUMMARY

A computer implemented method for determining reservation status information for a logical unit number (LUN). A host transmits a persistent reservation in command with read reservation to a first LUN, wherein the host is connected to a port of the data storage server to which the first LUN belongs. The host receives a message from the first LUN. The host determines that the message is a success message. The host, responsive to a determination that the message is a success message, sends to the first LUN, a persistent reservation with read keys. The host determines that the first LUN responds with a zero data length. The host, responsive to a determination that the first LUN responds with a zero data length, sends a SCSI command test unit ready to the first LUN. The host determines that the test unit ready (TUR) succeeds. The host, responsive to a determination that the TUR succeeds, verifies a reservation policy attribute of the first LUN.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a data structure that defines the reservation policy attribute of a LUN on the host for possible values of the reservation policy attribute of a LUN that can be set by a host in accordance with an illustrative embodiment of the invention;

DETAILED DESCRIPTION OF THE PREFERRED EMBODIMENT

Figure 1:
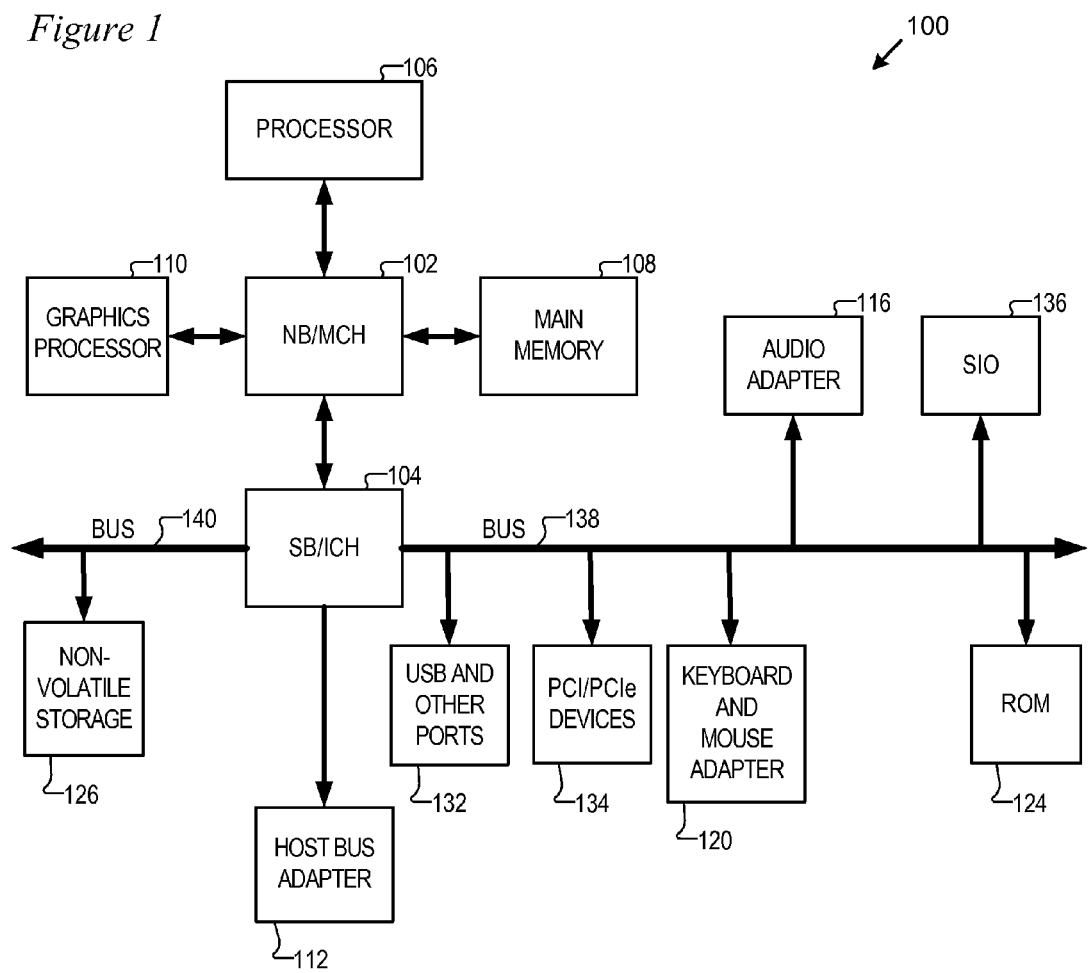
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area host bus adapter 112 connects to south bridge and I/O controller hub 104 and audio adapter 116, keyboard and mouse adapter 120, read only memory (ROM) 124, non-volatile storage 126, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Non-volatile storage 126 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on computer readable tangible storage devices, such as non-volatile storage 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) having computer readable program code embodied thereon.

Any combination of one or more computer readable storage device(s) may be utilized. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device. The term "computer-readable storage device" does not encompass a signal propagation media such as a copper cable, optical fiber or wireless transmission media.

A computer readable signal medium may be any computer readable medium that is not a computer readable storage medium and that can communicate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
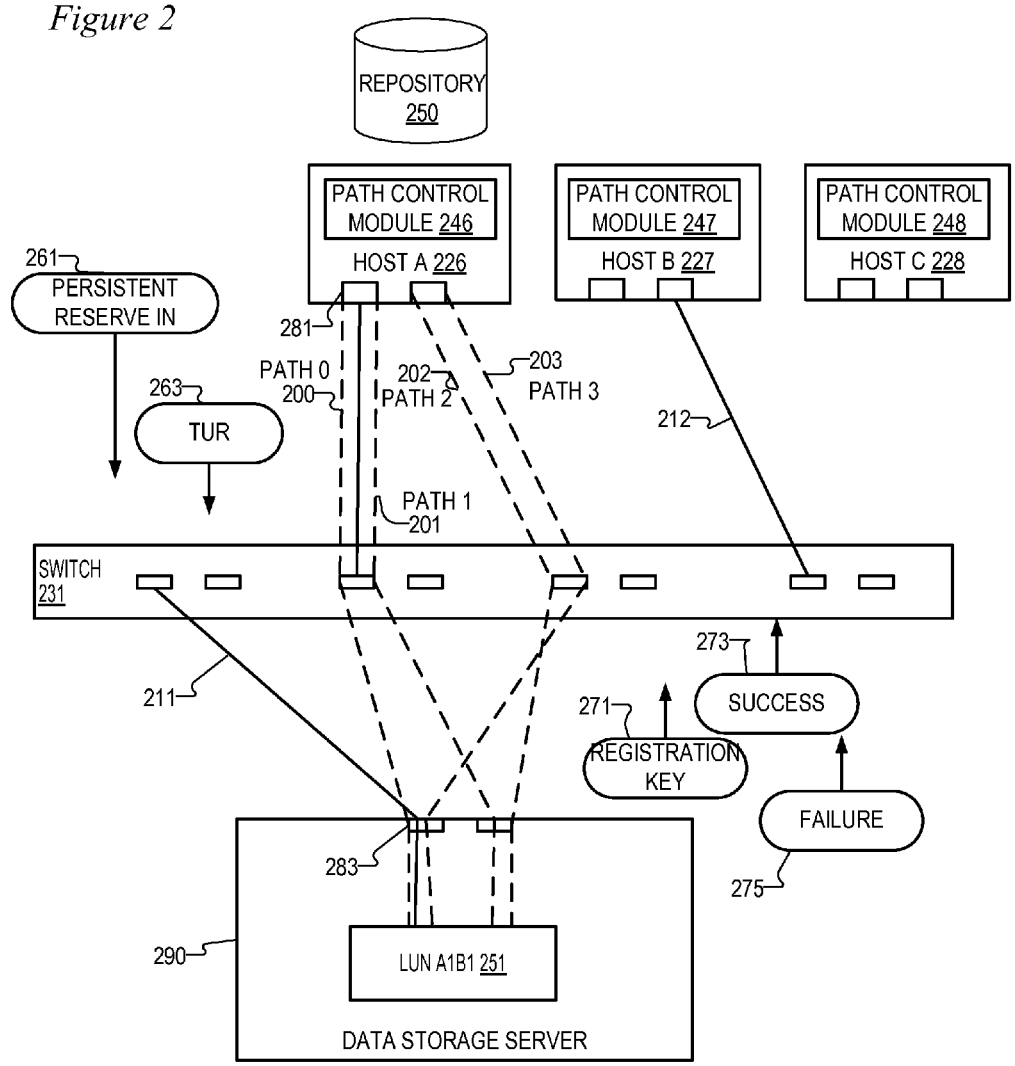
FIG. 2 is a block diagram of a storage area network in accordance with an illustrative embodiment of the invention.

FIG. 2 is a block diagram of a storage area network in accordance with an illustrative embodiment of the invention. A storage area network (SAN) is a dedicated storage network that provides access to consolidated, block level storage. Within the SAN are hosts, for example, host A 226, host B 227, and host C 228 which connect via their respective host bus adapters (HBA), such as, HBA 281. A host may be, for example, data processing system 100 of FIG. 1. Each host addresses one or more LUNs through the use of a switch 231. A switch is an entity within the SAN where a plurality of SCSI initiator devices are connected by way of the switch to a plurality of data storage servers. Each HBA may connect to a port on the switch. The switch, responsive to identifications in messages from a host, can redirect signals to a specific port on a LUN, such as, for example, port 283 on LUN A1B1 251. A LUN can be, for example, a disk, tape, optical medium access device, or the like. Host A 226 is shown as connecting to a LUN using four redundant I/O paths. An I/O path is the physical hardware and logical configuration that allows a LUN to communicate to a host. An I/O path (or equivalently, 'path') can be, for example, path 0 200, path 1 201, path 2 202 and path 3 203. Further paths may extend from other hosts or from the LUN, namely paths 211, 212.

Each path traverses a port on data storage server 290 on its way to LUN A1B1 251. A data storage server has one or more target controllers which provide access to LUNs to the hosts in the SAN. Each data storage server may host multiple LUNS.

A host is a data processing system that accesses a Storage Area Network (SAN). The host may transmit messages using either the SPC-rev2 or SPC-rev3 format. In this regard, the host may be a SCSI initiator and such messages may be transmitted over a SAN fabric. FIG. 2 depicts two messages that a host may transmit. First among these messages is the 'persistent reservation in' command 261. The persistent reservation (PR) IN command, or PRIN, is a SPC-3 specific command. A second among this messages is the 'test unit ready' (TUR) 263. The TUR or TUR command is specified in both SPC-2 as well as SPC-3. The accumulated status changes present in these and other messages may be recorded by the host into repository 250.

In response, the LUN may respond with one of three messages. These messages include 'registration key' 271, 'success' 273, and 'failure' 275 messages, as will be explained shortly. Each host may have a path control module. The path control module is a software component that is used to manage multiple paths to the LUN. The path control module maintains a local data structure internally to store the path identifiers for all the I/O paths to each LUN that the host accesses. For example, the path control module for host A 226, host B 227 and host C 228 is path control module 246, path control module 247 and path control module 248, respectively. A path control module can be a device driver executing on suitable hardware for managing the paths.

The illustrative embodiments permit a data processing system to identify and/or report reservation state information of a LUN to an application assigned to the data processing system. Furthermore, a host can determine, provided there is a SCSI reservation, the type of SCSI reservation, for example, reservation type 1 or reservation type 2. A type 1 reservation policy (or type 1 reservation) is a reservation policy for a target device organized according to one or more reserve and release SCSI commands. A type 2 reservation policy (or type 2 reservation) is a reservation policy for a target device organized according to one or more persistent reservation (PR) SCSI Commands. Accordingly, an application can respond appropriately when a LUN's state indicates that it is unavailable for one or more reasons.

Figure 5:
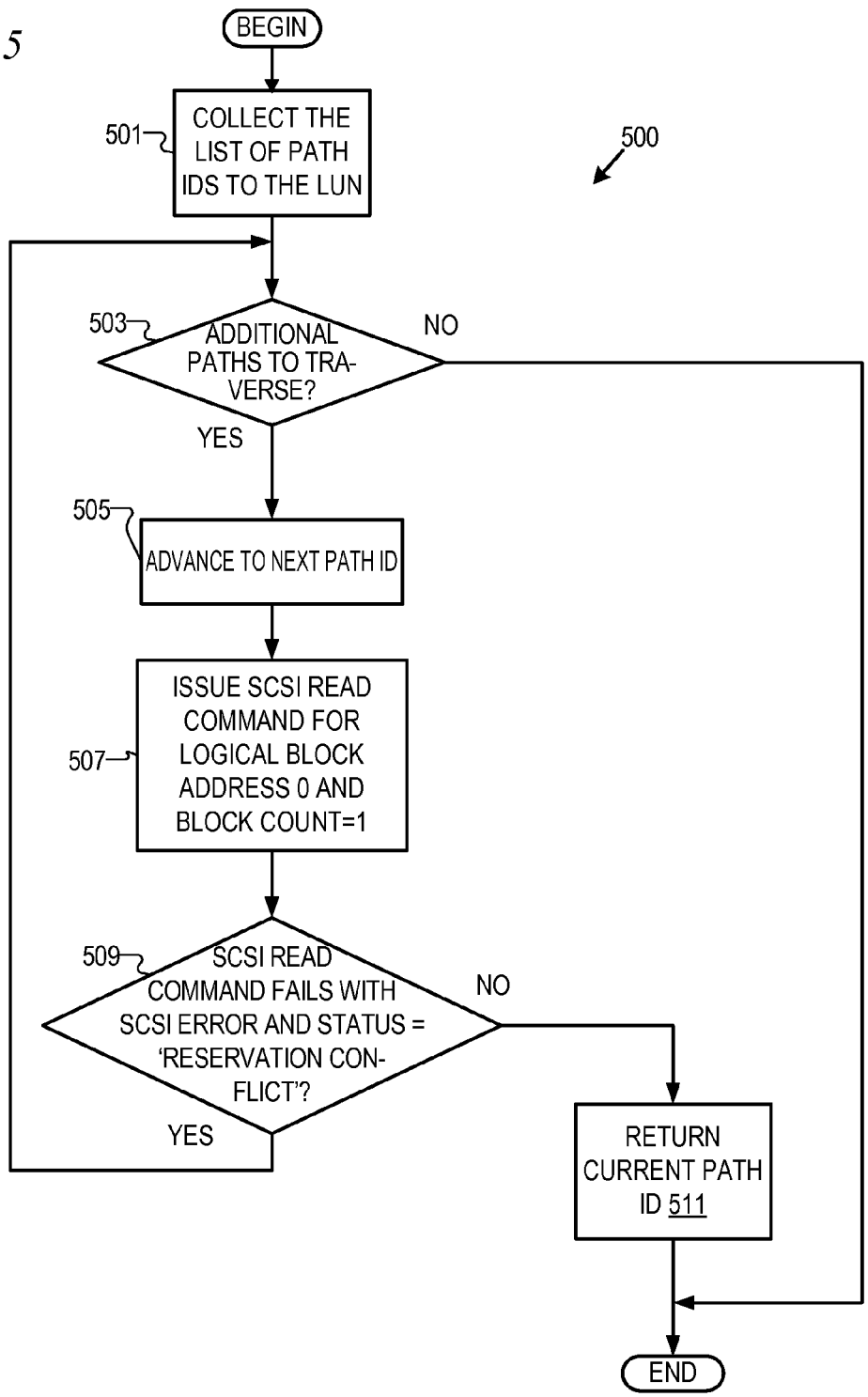
FIG. 5 is a flowchart of the host determining which combination of I/O path and host has a type 1 reservation in accordance with an illustrative embodiment of the invention.

FIG. 3 is a data structure that defines the reservation policy attribute of a LUN on the host for possible values of the reservation policy attribute of a LUN that can be set by a host in accordance with an illustrative embodiment of the invention. Reservation policy attribute database 300 may be stored to repository 250 of FIG. 2. A reservation policy is a policy assigned to a LUN based on its power status and/or previous interactions with one or more hosts. The LUN may first set its reservation policy, and then based on its responses to a host, the host may infer the current policy set, and correspondingly set the reservation policy attributes within repository 300. A reservation policy attribute is the assignment given by the host to a particular I/O path of a LUN or target disk. For example, disk 301, identified as "disk0" is assigned a reservation policy attribute of "type 2" 304. List 350 is a list of path identifiers to a LUN, in this case, "disk0". In the description of FIG. 5, below, the manner of traversing each path identifier will be shown in order to obtain the status for the paths of the LUN.

Figure 4:
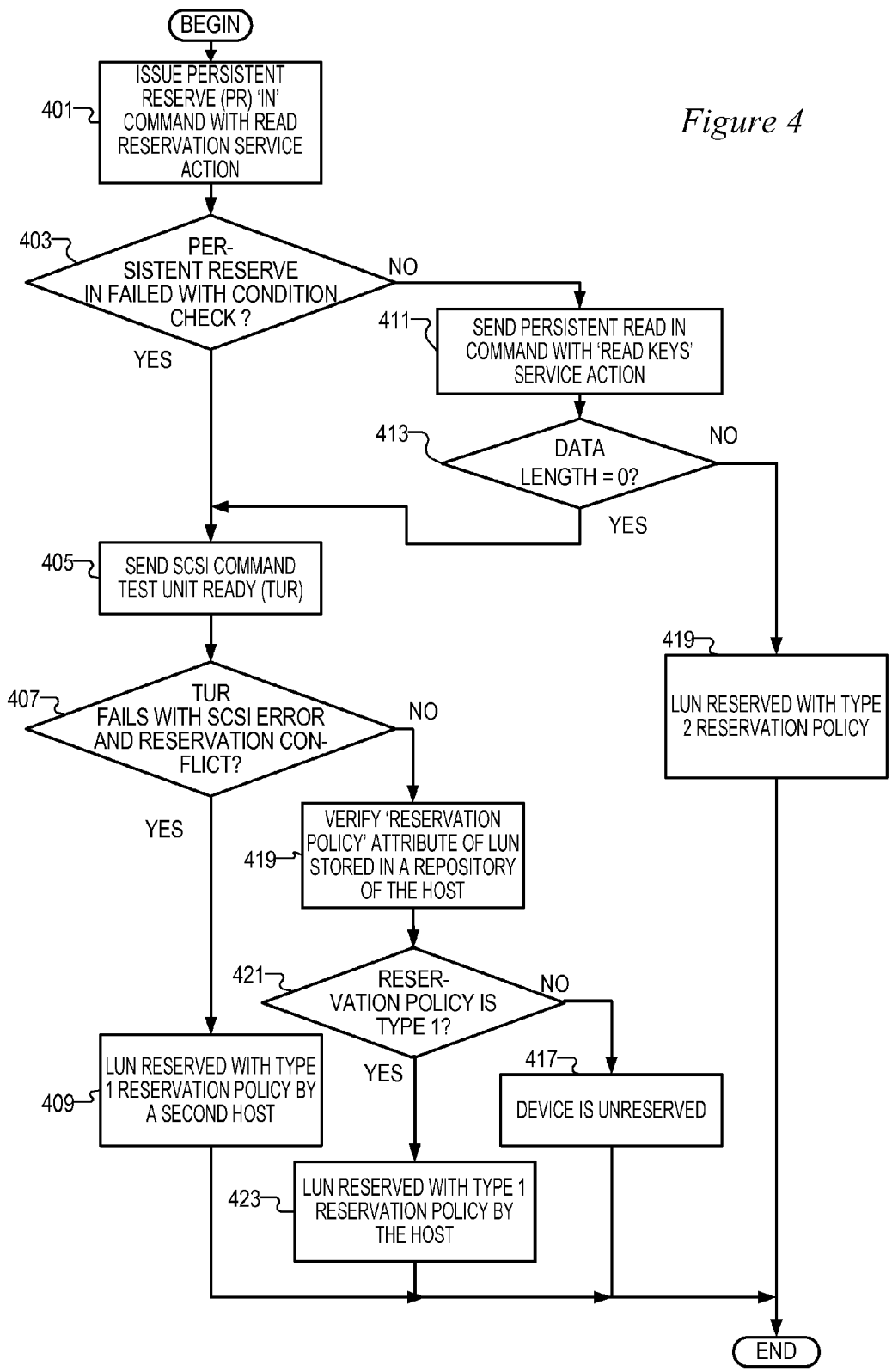
FIG. 4 is a flowchart for determining a status of a LUN in accordance with an illustrative embodiment of the invention.

FIG. 4 is a flowchart for determining a status of a LUN in accordance with an illustrative embodiment of the invention. Initially, a host may issue a persistent reserve (PR) in command with a 'read reservation' service action (step 401). A host can be, for example, host A 226 of FIG. 2. The persistent reserve (PR) in command may identify a LUN, which can be forwarded to the specific LUN by a switch, such as switch 231 of FIG. 2. The persistent reserve (PR) in command identifies the LUN as a target disk. A target disk is the disk identity for which status information is inquired about. Such identity information may be specified as a SCSI target according to either SPC-ver2 or SPC-ver3. More specifically, the disk identity may be specified as an I/O path from the port of the host to a port of the LUN. A port is a logical network address to which messages or signals may be directed and/or originated therefrom. A message is a digital signal formatted according to SPC-2 or SPC-3. Each of these messages follows the formatting rules specified for SCSI commands.

Next, the host may determine if the persistent reserve (PR) in command failed (step 403). The host may perform this step by receiving a message from the LUN, for example, LUN A1B1 251 of FIG. 2. The persistent reserve in command may fail and such failure made apparent to the host by the LUN sending, and the host receiving, one of two different messages. First among these messages is the SCSI error message and SCSI status set to 'reservation conflict'. A 'reservation conflict' may be identified by a predetermined number or status code. Second among these messages is the SCSI error message with SCSI status set to 'check condition error' with additional status code set to 'invalid command error'. A check condition error is a SCSI message returned to the host with, for example, a SCSI status code 0x02, in the status code of the response message. However, the LUN can, instead, transmit a success message, in response to the host.

In response to receiving a success message, the host may send a persistent reservation in command with 'read keys' service action (step 411). The persistent reservation in command with read keys is a message having a predetermined number setting in a field of the message. The persistent reservation (PR) 'in' command is issued with the "Service action" field set to "Read Keys". The value of "Read Keys" is as per the SPC-2 or SPC-3 standard. Like the earlier 'persistent reserve in command with read reservation', the host addresses the persistent reservation with read keys by identifying the LUN in the message. Normally, the LUN will respond.

Accordingly, next, the host may determine if the LUN response for a persistent reservation (PR) in command with service action field set to "Read Keys" includes a SCSI response having a zero data length (step 413). The status of zero data length can be determined by reading the SCSI response message to determine that the field called "additional length" has zero stored therein. In response to a positive determination, the host may send a SCSI command test unit ready (TUR) (step 405). A SCSI command test unit ready is a command or message sent with an opcode of 0x00 (hexadecimal nomenclature uses the '0x' preface herein) in the command descriptor block (CDB) of the message. The LUN may respond in a manner that the host can interpret. Accordingly, next, the host determines if the TUR fails with SCSI error and reservation conflict (step 407). A reservation conflict is expressed in a response from a SCSI target, the LUN in this case, where the contents of the response message include 0x18 in the SCSI status field. If the result of step 407 is negative, the host may verify a reservation policy attribute of the LUN stored in a repository on the host (step 419). It is appreciated that the host may store the device attributes in any format, for example, a file or a database. A reservation policy attribute is one of the attributes of the device on the host which can be modified by the user. The reservation policy attribute can be used by the user to decide what kind of reservations the user wants to be placed on the LUN while opening and accessing the LUN. Accordingly, the user can set the reservation policy attribute to be either "type 1 reservation", "type 2 reservation" or "no reservation". FIG. 3 shows how a host can store and manage the reservation policy attribute of a LUN. If the reservation policy attribute of a LUN on a host is set to type 2, then each I/O Path of the LUN will have another attribute called a persistent reservation (PR) key" which is specified by the user as per the SPC-3 standard. The PR key is used by the host while sending the persistent reservation commands (in or out) to the LUN. Based on the verification (a lookup), the host determines whether the reservation policy attribute is type 1 reservation policy (step 421). In step 421 the reservation policy attribute is read to compare if the value indicates "type 1 reservation". If the policy is "type 1 reservation", then the SCSI reservation query module reports the reservation on the LUN as type 1 reservation. However, if the policy is not type 1, the SCSI reservation query module reports the LUN as unreserved (step 417). If the reservation policy is type 1, the host may identify the LUN as reserved with type 1 reservation by the host (step 423).

On the other hand, if the host determines at step 407 a failure ('Yes' branch), the host may indicate the LUN is reserved with type 1 reservation by a second host (step 409).

In addition, if the host determines at step 403 a failure ('Yes' branch), the host may next perform step 405.

Further, in the case the host determined at step 413, that the LUN responded with a non-zero data length, the host may identify the LUN reserved with a type 2 reservation (step 419).

Processing may terminate after steps 409, 417, 419 and 423.

FIG. 5 is a flowchart of the host determining which combination of I/O path and host has a type 1 reservation in accordance with an illustrative embodiment of the invention. The flowchart may be executed in response to step 423 of FIG. 4 being performed. Initially, the host may collect the list of path identifiers to the LUN (step 501). The list can be, for example, list 350 of FIG. 3. Next, the host may determine if there are additional paths to traverse (step 503). In other words, the host may have determined that at least one additional path remains untraversed. An untraversed path is a path that has not been the subject of a SCSI read command (as set forth, below at step 507) since the collection step, 501, and prior to the ending of processing of process 500. Responsively, the host advances to the next path identifier (step 505). Next, the host issues a SCSI read command for Logical Block Address 0 and block count of 1 (step 507). Next, the host may determine if the SCSI read command fails with SCSI error and SCSI status set to 'reservation conflict' (step 509).

If the result is positive—a SCSI read command failure—the host may repeat step 503. However, if the result of step 509 is negative, the host may return the current path identifier (step 511). "Returning the current path identifier" means that the host may provide the path identifier to an application. Processing may terminate thereafter, or in response to a negative outcome at step 503.

In summary, the host can determine an absence of a SCSI read command failure with SCSI error, where the command failure has a status set to reservation conflict. Further, step 511 illustrates how the host, responsive to a determination of the absence of the SCSI read command failure with SCSI error and status set to reservation conflict, returns a current path identifier corresponding to the path.

Accordingly, one or more embodiments provide a method to reliably indicate reservation conflicts to a user or application of a host, regardless of whether the applicable LUN operates according to SPC-2 or SPC-3 standards for reserving target disks or LUNs. Moreover, one or more embodiments permit reports of the status for multiple I/O paths be collected and stored local to the host for further action. As a consequence of use of an embodiment, a data center operator may mix LUNs having varying firmware or SCSI behavior models and still be able to coordinate access to data stored therein among the plural hosts of the data center.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product for determining reservation status information for a logical unit number (LUN), the computer program product comprising: one or more computer-readable, tangible storage devices;

program instructions, stored on at least one of the one or more computer-readable, tangible storage devices, to transmit a first persistent reservation in command with a read reservation to a first LUN, wherein a host is connected to a port of a data storage server to which the first LUN belongs;

program instructions, stored on at least one of the one or more computer-readable, tangible storage devices, to receive a message from the first LUN;

program instructions, stored on at least one of the one or more computer-readable, tangible storage devices, to determine that the message is a success message;

program instructions, stored on at least one of the one or more computer-readable, tangible storage devices, to send to the first LUN the a second persistent reservation in command with read keys, responsive to a determination that the message is the success message;

program instructions, stored on at least one of the one or more computer-readable, tangible storage devices, to determine that the first LUN responds with a message containing an additional length field set to zero;

program instructions, stored on at least one of the one or more computer-readable, tangible storage devices, to send a Small Computer System Interface (SCSI) command test unit ready to the first LUN, responsive to a determination that the first LUN responds with the message containing an additional length field set to zero, wherein the SCSI command test unit ready is a message having a command descriptor block set to zero;

program instructions, stored on at least one of the one or more computer-readable, tangible storage devices, to determine that the SCSI command test unit ready (TUR) succeeds;

program instructions, stored on at least one of the one or more computer-readable, tangible storage devices, to verify a reservation policy attribute of the first LUN, responsive to a determination that the SCSI command TUR succeeds;

program instructions, stored on at least one of the one or more computer-readable, tangible storage devices, to identify the first LUN as reserved with a type 1 reservation by the host, responsive to a determination that the reservation policy is a type 1 reservation;

program instructions, stored on at least one of the one or more computer-readable, tangible storage devices, to transmit a third persistent reservation in command with read keys to a second LUN, wherein the host is connected to a port of the data storage server of the second LUN;

program instructions, stored on at least one of the one or more computer-readable, tangible storage devices, to determine that the second LUN responds with a message containing an additional length field not set to zero; and program instructions, stored on at least one of the one or more computer-readable, tangible storage devices, to identify the second LUN as reserved with a type 2 reservation by the host simultaneously with the first LUN being reserved with the type 1 reservation, responsive to determining that the second LUN responds with a message containing an additional length field not set to zero, wherein the second LUN is configured to respond to persistent reservation in commands without a SCSI error and a SCSI status of a reservation conflict, and the first LUN is configured not to respond to persistent reservation in commands without a SCSI error and a SCSI status of a reservation conflict.

2. The computer program product of claim 1, further comprising:

program instructions, stored on at least one of the one or more computer-readable, tangible storage devices, to identify the first LUN as unreserved by the host, responsive to a determination that the reservation policy is not a type 1 reservation.

3. A computer program product for determining reservation status information for a logical unit number (LUN), the computer program product comprising: one or more computer-readable, tangible storage devices;
  program instructions, stored on at least one of the one or more computer-readable, tangible storage devices, a host to transmit a first persistent reservation in command with a read reservation to a first LUN, wherein the host is connected to a port of a data storage server to which the first LUN belongs;
  program instructions, stored on at least one of the one or more computer-readable, tangible storage devices, to receive a first message from the first LUN;
  program instructions, stored on at least one of the one or more computer-readable, tangible storage devices, to determine that the first message is a success message;
  responsive to a determination that the first message is a success message, program instructions, stored on at least one of the one or more computer-readable, tangible storage devices, to send to the first LUN, a second persistent reservation in command with read keys;
  program instructions, stored on at least one of the one or more computer-readable, tangible storage devices, to determine that the first LUN responds with a message containing an additional length field set to zero;
  program instructions, stored on at least one of the one or more computer-readable, tangible storage devices, to send a first Small Computer System Interface (SCSI) command test unit ready to the first LUN, responsive to a determination that the first LUN responds with the message containing an additional length field set to zero, wherein the first SCSI command test unit ready is a message having a command descriptor block set to zero;
  program instructions, stored on at least one of the one or more computer-readable, tangible storage devices, to determine that the first SCSI command test unit ready (TUR) succeeds;
  program instructions, stored on at least one of the one or more computer-readable, tangible storage devices, to verify a reservation policy attribute of the first LUN, responsive to a determination that the first SCSI command TUR succeeds;
  program instructions, stored on at least one of the one or more computer-readable, tangible storage devices, to identify the first LUN as reserved with a type 1 reservation by the host, responsive to a determination that the reservation policy is a type 1 reservation;
  program instructions, stored on at least one of the one or more computer-readable, tangible storage devices, to transmit a third persistent reservation in command with read reservation to a second LUN, wherein the host is connected to a port of the data storage server of the second LUN;
  program instructions, stored on at least one of the one or more computer-readable, tangible storage devices, to receive a second message from the second LUN;
  program instructions, stored on at least one of the one or more computer-readable, tangible storage devices, to determine that the second message is a failure message;
  program instructions, stored on at least one of the one or more computer-readable, tangible storage devices, to send a second Small Computer System Interface (SCSI) command test unit ready (TUR) to the second LUN, responsive to a determination that the second message is a failure message;
  program instructions, stored on at least one of the one or more computer-readable, tangible storage devices, to determine whether the second LUN responds with a SCSI error and a SCSI status of a reservation conflict;
  program instructions, stored on at least one of the one or more computer-readable, tangible storage devices, to identify the second LUN as reserved with a type 1 reservation by another host, responsive to a determination that the second LUN responds with the SCSI error and the SCSI status of the reservation conflict;
  program instructions, stored on at least one of the one or more computer-readable, tangible storage devices, to transmit a fourth persistent reservation in command with read keys to a third LUN, wherein the host is connected to a port of the data storage server of the third LUN;
  program instructions, stored on at least one of the one or more computer-readable, tangible storage devices, to determine that the third LUN responds with a third message containing an additional length field not set to zero; and
  program instructions, stored on at least one of the one or more computer-readable, tangible storage devices, to identify the third LUN as reserved with a type 2 reservation by the host simultaneously with the first LUN being reserved with the type 1 reservation, wherein the third LUN is configured to respond to persistent reservation in commands without a SCSI error and a SCSI status of a reservation conflict, and the first and second LUNS are configured not to respond to persistent reservation in commands without a SCSI error and a SCSI status of a reservation conflict, responsive to a determination that the third LUN responds with the third message containing the additional length field not set to zero.

4. The computer program product of claim 3, wherein program instructions, stored on at least one of the one or more computer-readable, tangible storage devices, to determine that the second message is a failure message comprises program instructions, stored on at least one of the one or more computer-readable, tangible storage devices to determine that the second message is a check condition with an invalid command error.

5. The computer program product of claim 1, further comprising:
  program instructions, stored on at least one of the one or more computer-readable, tangible storage devices, to report to an application the first LUN as unreserved.

6. A data processing system for determining reservation status information for a logical unit number (LUN), wherein processing system comprising: one or more processors, one or more computer-readable memories and one or more computer-readable, tangible storage devices;
  program instructions, stored on at least one of the one or more computer-readable, tangible storage devices for execution by at least one of the one or more processors via at least one of the one or more memories, a host to transmit a first persistent reservation in command with a read reservation to a first LUN, wherein the host is connected to a port of a data storage server to which the first LUN belongs;
  program instructions, stored on at least one of the one or more computer-readable, tangible storage devices for execution by at least one of the one or more processors via at least one of the one or more memories, to receive a message from the first LUN;
  program instructions, stored on at least one of the one or more computer-readable, tangible storage devices for execution by at least one of the one or more processors via at least one of the one or more memories, to determine that the message is a success message;

program instructions, stored on at least one of the one or more computer-readable, tangible storage devices for execution by at least one of the one or more processors via at least one of the one or more memories, to send to the first LUN, a second persistent reservation in command with read keys, responsive to a determination that the message is a success message;

program instructions, stored on at least one of the one or more computer-readable, tangible storage devices for execution by at least one of the one or more processors via at least one of the one or more memories, to determine that the first LUN responds with a message containing an additional length field set to zero;

program instructions, stored on at least one of the one or more computer-readable, tangible storage devices for execution by at least one of the one or more processors via at least one of the one or more memories, to send a Small Computer System Interface (SCSI) command test unit ready to the first LUN, responsive to a determination that the first LUN responds with the message containing an additional length field set to zero, wherein the SCSI command test unit ready is a message having a command descriptor block set to zero;

program instructions, stored on at least one of the one or more computer-readable, tangible storage devices for execution by at least one of the one or more processors via at least one of the one or more memories, to determine that the SCSI command test unit ready (TUR) succeeds;

program instructions, stored on at least one of the one or more computer-readable, tangible storage devices for execution by at least one of the one or more processors via at least one of the one or more memories, to verify a reservation policy attribute of the first LUN, responsive to a determination that the SCSI command TUR succeeds;

program instructions, stored on at least one of the one or more computer-readable, tangible storage devices for execution by at least one of the one or more processors via at least one of the one or more memories, to identify the first LUN as reserved with a type 1 reservation by the host, responsive to a determination that the reservation policy is a type 1 reservation;

program instructions, stored on at least one of the one or more computer-readable, tangible storage devices for execution by at least one of the one or more processors via at least one of the one or more memories, to transmit a third persistent reservation in command with read keys to a second LUN, wherein the host is connected to a port of the data storage server of the second LUN;

program instructions, stored on at least one of the one or more computer-readable, tangible storage devices for execution by at least one of the one or more processors via at least one of the one or more memories, to determine that the second LUN responds with a message containing an additional length field not set to zero; and program instructions, stored on at least one of the one or more computer-readable, tangible storage devices for execution by at least one of the one or more processors via at least one of the one or more memories, to identify the second LUN as reserved with a type 2 reservation by the host simultaneously with the first LUN being reserved with the type 1 reservation, responsive to determining that the second LUN responds with a message containing an additional length field not set to zero, wherein the second LUN is configured to respond to persistent reservation in commands without a SCSI error and a SCSI status of a reservation conflict, and the first LUN is configured not to respond to persistent reservation in commands without a SCSI error and a SCSI status of a reservation conflict.

7. The data processing system of claim 6, further comprising:
program instructions, stored on at least one of the one or more computer-readable, tangible storage devices for execution by at least one of the one or more processors via at least one of the one or more memories, to identify the first LUN as unreserved by the host, responsive to a determination that the reservation policy is not a type 1 reservation.

8. A data processing system for determining reservation status information for a logical unit number (LUN), wherein processing system comprising: one or more processors, one or more computer-readable memories and one or more computer-readable, tangible storage devices;

program instructions, stored on at least one of the one or more computer-readable, tangible storage devices for execution by at least one of the one or more processors via at least one of the one or more memories, a host to transmit a first persistent reservation in command with a read reservation to a first LUN, wherein the host is connected to a port of a data storage server to which the first LUN belongs;

program instructions, stored on at least one of the one or more computer-readable, tangible storage devices for execution by at least one of the one or more processors via at least one of the one or more memories, to receive a first message from the first LUN;

program instructions, stored on at least one of the one or more computer-readable, tangible storage devices for execution by at least one of the one or more processors via at least one of the one or more memories, to determine that the first message is a success message;

responsive to a determination that the message is a success message, program instructions, stored on at least one of the one or more computer-readable, tangible storage devices for execution by at least one of the one or more processors via at least one of the one or more memories, to send to the first LUN, a second persistent reservation in command with read keys;

program instructions, stored on at least one of the one or more computer-readable, tangible storage devices for execution by at least one of the one or more processors via at least one of the one or more memories, to determine that the first LUN responds with a message containing an additional length field set to zero;

program instructions, stored on at least one of the one or more computer-readable, tangible storage devices for execution by at least one of the one or more processors via at least one of the one or more memories, to send a first Small Computer System Interface (SCSI) command test unit ready to the first LUN, responsive to a determination that the first LUN responds with the message containing an additional length field set to zero, wherein the first SCSI command test unit ready is a message having a command descriptor block set to zero;

program instructions, stored on at least one of the one or more computer-readable, tangible storage devices for execution by at least one of the one or more processors via at least one of the one or more memories, to determine that the first SCSI command test unit ready (TUR) succeeds;

program instructions, stored on at least one of the one or more computer-readable, tangible storage devices for execution by at least one of the one or more processors via at least one of the one or more memories, to verify a reservation policy attribute of the first LUN, responsive to a determination that the first SCSI command TUR succeeds;

program instructions, stored on at least one of the one or more computer-readable, tangible storage devices for execution by at least one of the one or more processors via at least one of the one or more memories, to identify the first LUN as reserved with a type 1 reservation by the host, responsive to a determination that the reservation policy is a type 1 reservation;

program instructions, stored on at least one of the one or more computer-readable, tangible storage devices for execution by at least one of the one or more processors via at least one of the one or more memories, to transmit a third persistent reservation in command with a read reservation to a second LUN, wherein the host is connected to a port of the data storage server of the second LUN;

program instructions, stored on at least one of the one or more computer-readable, tangible storage devices for execution by at least one of the one or more processors via at least one of the one or more memories, to receive a second message from the second LUN;

program instructions, stored on at least one of the one or more computer-readable, tangible storage devices for execution by at least one of the one or more processors via at least one of the one or more memories, to determine that the second message is a failure message;

program instructions, stored on at least one of the one or more computer-readable, tangible storage devices for execution by at least one of the one or more processors via at least one of the one or more memories, to send a second Small Computer System Interface (SCSI) command test unit ready (TUR) to the second LUN, responsive to a determination that the second message is a failure message;

program instructions, stored on at least one of the one or more computer-readable, tangible storage devices for execution by at least one of the one or more processors via at least one of the one or more memories, to determine whether the second LUN responds with a SCSI error and a SCSI status of a reservation conflict;

program instructions, stored on at least one of the one or more computer-readable, tangible storage devices for execution by at least one of the one or more processors via at least one of the one or more memories, to identify the second LUN as reserved with a type 1 reservation by another host, responsive to a determination that the second LUN responds with the SCSI error and the SCSI status of the reservation conflict;

program instructions, stored on at least one of the one or more computer-readable, tangible storage devices for execution by at least one of the one or more processors via at least one of the one or more memories, to transmit a fourth persistent reservation in command with read keys to a third LUN, wherein the host is connected to a port of the data storage server of the third LUN;

program instructions, stored on at least one of the one or more computer-readable, tangible storage devices for execution by at least one of the one or more processors via at least one of the one or more memories, to determine that the third LUN responds with a third message containing an additional length field not set to zero; and program instructions, stored on at least one of the one or more computer-readable, tangible storage devices for execution by at least one of the one or more processors via at least one of the one or more memories, to identify the third LUN as reserved with a type 2 reservation by the host simultaneously with the first LUN being reserved with the type 1 reservation, wherein the third LUN is configured to respond to persistent reservation in commands without a SCSI error and a SCSI status of a reservation conflict, and the first and second LUNS are configured not to respond to persistent reservation in commands without a SCSI error and a SCSI status of a reservation conflict, responsive to a determination that the third LUN responds with the third message containing the additional length field not set to zero.

9. The data processing system of claim 8, wherein program instructions, stored on at least one of the one or more computer-readable, tangible storage devices for execution by at least one of the one or more processors via at least one of the one or more memories, to determine that the second message is a failure message comprises program instructions, stored on at least one of the one or more computer-readable, tangible storage devices to determine that the second message is a check condition with an invalid command error.

10. The data processing system of claim 6, further comprising:
program instructions, stored on at least one of the one or more computer-readable, tangible storage devices for execution by at least one of the one or more processors via at least one of the one or more memories, to report to an application the first LUN as unreserved.

* * * * *